United States Patent

[11] 3,591,806

| [72] | Inventors | Aaron B. Brill;<br>James A. Patton; Jon J. Erickson; Paul H. King, all of Nashville, Tenn. |
|---|---|---|
| [21] | Appl. No. | 20,287 |
| [22] | Filed | Mar. 17, 1970 |
| [45] | Patented | July 6, 1971 |
| [73] | Assignee | The United States of America as represented by the United States Atomic Energy Commission |

[54] MULTICRYSTAL TOMOGRAPHIC SCANNER FOR MAPPING THIN CROSS SECTION OF RADIOACTIVITY IN AN ORGAN OF THE HUMAN BODY
10 Claims, 10 Drawing Figs.

| [52] | U.S. Cl. | 250/71.5 S, 250/61.5 |
|---|---|---|
| [51] | Int. Cl. | G01t 1/20 |
| [50] | Field of Search | 250/61.5, 71.5 R, 71.5 S |

[56] References Cited
UNITED STATES PATENTS

| 3,428,805 | 2/1969 | Donato et al. | 250/71.5 S |
|---|---|---|---|
| 3,432,660 | 3/1969 | Anger | 250/71.5 S |
| 3,509,341 | 4/1970 | Hindel et al. | 250/71.5 S |

*Primary Examiner*—Archie R. Borchelt
*Attorney*—Roland A. Anderson

ABSTRACT: A multicrystal tomographic scanner is utilized for mapping thin slices or cross sections of radioactivity in an organ of the human body which has been injected or ingested with a suitable radioisotope. A plurality of radiation detectors are arranged in a cylindrical monoplanar array with each detector focused in such a manner that the fields of view of all of the detectors intersect at a common point, and the detectors are driven mechanically such that this common point of the detectors is caused to move in a rectilinear raster of about 8 inches square. The distribution of radioactivity measured by the detectors due to the amount of radioisotope within the area being scanned is stored in a computer memory and reproduced on an oscilloscope display, as the section is being examined.

PATENTED JUL 6 1971

INVENTORS.
Aaron B. Brill
James A. Patton
Jon J. Erickson
Paul H. King

BY

ATTORNEY.

Fig. 2

INVENTORS.
Aaron B. Brill
James A. Patton
Jon J. Erickson
BY Paul H. King

ATTORNEY.

INVENTORS
Aaron B. Brill
James A. Patton
Jon J. Erickson
Paul H. King

BY

ATTORNEY.

MULTICRYSTAL TOMOGRAPHIC SCANNER FOR MAPPING THIN CROSS SECTION OF RADIOACTIVITY IN AN ORGAN OF THE HUMAN BODY

BACKGROUND OF the INVENTION

This invention was made in the course of, or under, a contract with the U.S. Atomic Energy Commission.

The use of radioisotopes in diagnostic Nuclear Medicine for visualizing organs and abnormalities within the body is a proven tool of the clinician. One of the problems associated with any scanning detector system and the scan data display therefrom is the difficulty in viewing deep sources of radioactivity which may be hidden by overlying areas of radioactivity, particularly in the region of the brain. These areas may be superficial areas of activity which may make it difficult in some instances to obtain an adequate or accurate scan picture of the deep lying source, particularly when it is desired to obtain an online display of the sensed radioactivity distribution in real time for brain scans, for example.

Thus, there exists a need for a scanning system that will provide an accurate mapping of the radioactive distribution in deep regions of an area which may be obscured by overlying radioisotope distributions, while at the same time providing an online display of such mapping in real time. The present invention was conceived to meet this need in a manner to be described hereinbelow.

SUMMARY OF THE INVENTION

It is the object of the present invention to provide an improved scanning device which will enable tomographic scanning of differentiable spatial distributions of matter, especially radionuclide matter, so as to aid in visualization of the size and location of body tissues demonstrating an abnormal uptake of, in particular, radioisotopes.

The above object has been accomplished in the present invention by providing a monoplanar cylindrical array of radiation detectors. Each detector is free to rotate about a vertical axis and the detectors are mechanically coupled to a common driving point. The detectors are oriented so that their fields of view intersect at a point which is directly below the above common driving point, and means are provided for moving the driving point in any desired path which may be a rectilinear raster, for example, while at the same time effecting a corresponding movement of the above intersection point of the detectors' fields of view in such fashion as to provide a tomographic (i.e., cross-sectional) scan of a desired section through some portion of a human body. The detectors collect the radioactive emanations from an 8 inch by 8 inch square area, for example. The distribution of radioactivity measured by the detectors due to the amount of radioisotope within this area is stored in a computer memory and reproduced on an oscilloscope display, as the section is being examined, in an array of 64 by 64 dots. The intensity of a dot depends on the amount of radioactivity measured in the position in the scanning area to which this dot corresponds. Thus, a photograph can be obtained which portrays the distribution of radioisotope in the cross section being examined.

DESCRIPTION OF THE PREFERRED EMBODIMENT

Figure 1:
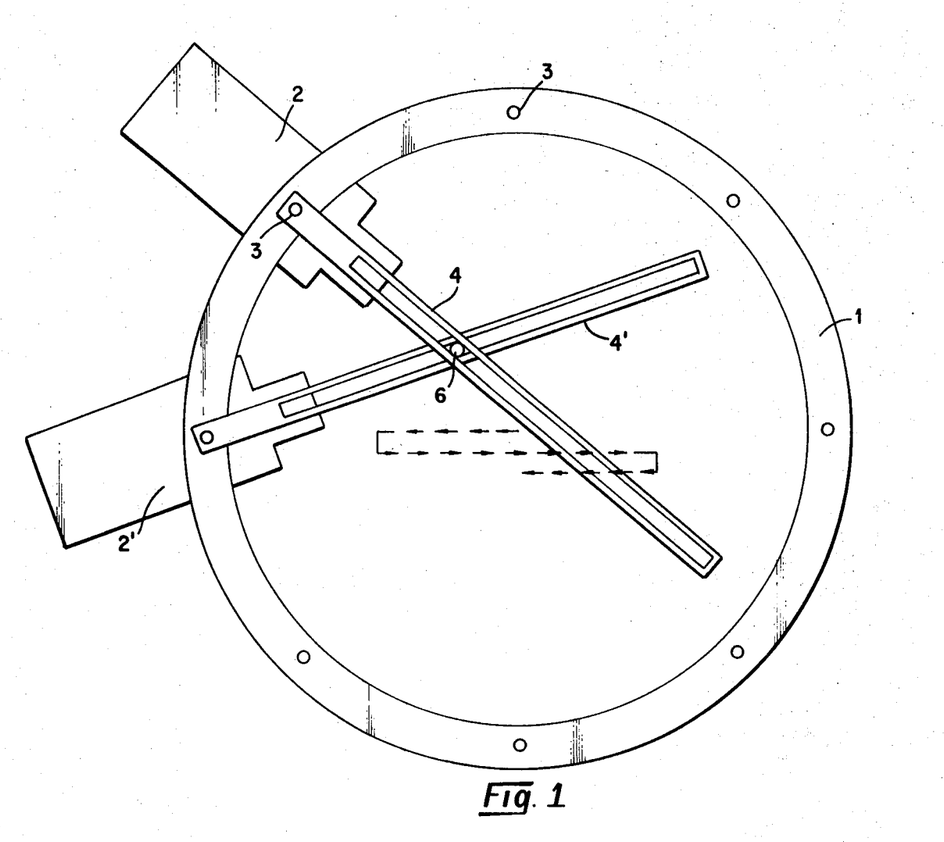
FIG. 1 is a top view of one scanner arrangement of the present invention.
Figure 2:
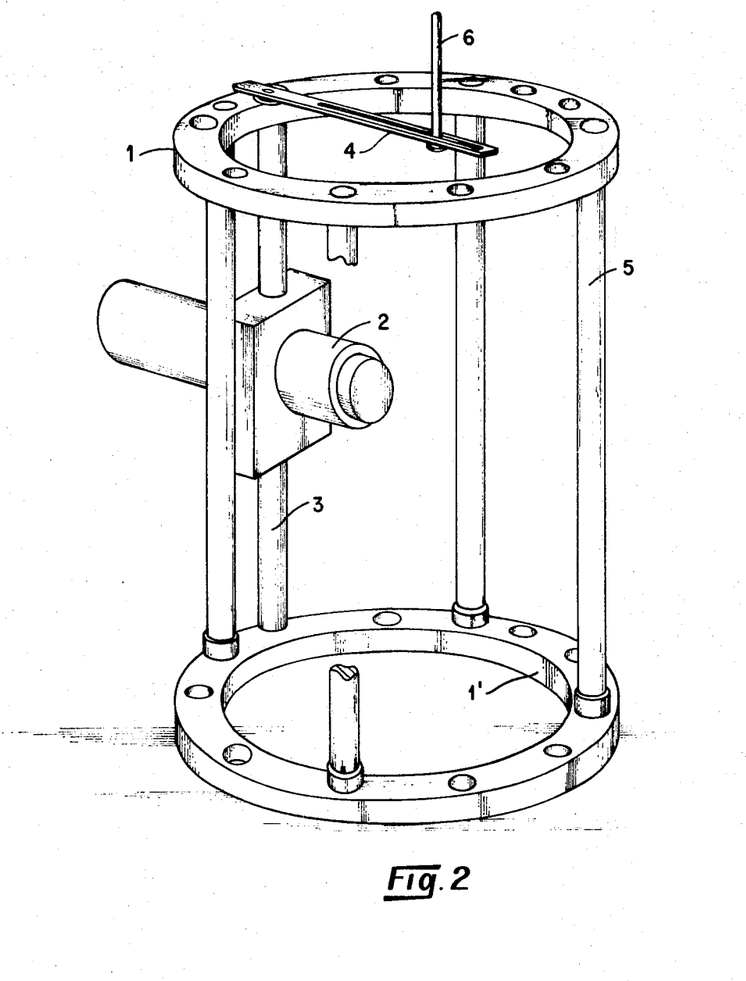
FIG. 2 is a perspective view of the scanner of FIG. 1.
Figure 3:
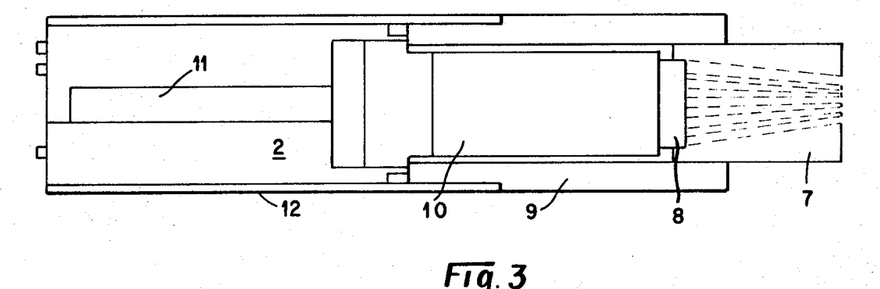
FIG. 3 is a sectional view of one of the detector assemblies used in the scanner of FIG. 1.

FIGS. 1, 2 and 3 show part of the details of one scanner embodiment of the present invention. As can be more clearly seen in FIG. 2, the scanner has the general configuration of a cylindrical cage with a top ring 1, a bottom ring 1', and four vertical support posts 5 affixed to the rings 1, 1' and spaced at 90° intervals. In addition to the four support posts 5, there are provided eight additional posts 3 extending between the rings 1 and 1', only one such post 3 being shown in FIG. 2 for the sake of clarity. Each end of each of the posts 3 is fitted in a ball bearing journal assembly in the respective rings 1, 1', and each post 3 extends above the top ring 1 and is affixed to a slotted member 4 such that when the member 4 is moved to different positions, in a manner to be described hereinbelow, the associated post 3 affixed thereto will rotate about its axis. There are two posts 3 positioned between each of the support posts 5. Since only one of these posts 3 is shown in FIG. 2, for the sake of clarity, some of the mounting holes in the rings 1 and 1' for the other posts 3, not shown, may be seen in FIG. 2.

A radiation detector assembly 2 is fixedly mounted on each of the posts 3 such that as each post is rotated in its bearing assemblies by its associated positioning arm 4, each of the detectors 2 will follow any rotational movement of the post 3 to which it is attached. Thus, the eight detectors 2 are arranged in a circle on a monoplane. Only two of the radiation detectors, 2 and 2', are shown in the top view of the scanner in FIG. 1 for the sake of clarity. The slotted arms 4 and 4' associated with the detectors 2 and 2' and the slotted arms of the other six detectors, not shown, are mechanically coupled to a driving shaft 6 of an Ohio-Nuclear Model 54D, rectilinear scanner, not shown. The driving shaft 6 of the rectilinear scanner extends through the slot in each of the arms 4 associated with the posts 3 carrying the respective radiation detectors 2, such that as the shaft 6 is caused to move through a rectilinear raster, the fields of view of the respective radiation detectors, which intersect at a point which is directly below the driving point of the shaft 6, are caused to shift in position such that the detectors are forced to follow the driving point as it moves in its rectilinear raster. In other words, as the driving point is moved through a rectilinear raster of 8 inches square, for example, the detectors'fields of view follow this point and the system measures the distribution of activity which lies in a plane defined by the fields of view of the detectors in a manner to be described hereinbelow.

The scanner illustrated in FIGS. 1 and 2 was designed primarily for use in obtaining cross-sectional tomographic brain scans. For this purpose, the height of the cage assembly shown in FIG. 2 may be about 2 feet, for example, and the bottom ring 1' is then placed on the top of any suitable wooden frame assembly, not shown, with the top of such an assembly being provided with a circular opening with a diameter slightly less than the inside diameter of the ring 1' of the scanner cage assembly. A patient from whom it is desired to obtain a sectional brain scan may then be placed in the wooden frame assembly and jacked up to a desired position such that his head is positioned in the fields of view of the detectors 2 of the device of FIG. 2. The patient's head is supported by any suitable means, not shown, while it is positioned within the detector assembly to keep it relatively stationary while a desired cross-sectional scan through the desired plane of his head is being effected by the device of FIG. 2.

It should be understood that the detector assembly of FIG. 2 is not necessarily limited to the use for effecting single cross-sectional brain scans. For example, the patient may be repositioned after a scan has been made through one desired cross-sectional plane through his head and a new and different scan may then be made through a different cross-sectional plane, and at as many other patient positions as may be necessary or desired. Alternatively, it is within the scope of the present invention to provide multiple layers of tomographic scanners such that each layer of eight radiation detectors may be coupled to its own readout system to provide a plurality of cross-sectional scans of a plurality of planes, either selectively or simultaneously. It should also be understood that the scanner of FIG. 2 is not limited for use in effecting only brain scans. For example, it is within the scope of the present invention to extend the height and diameter of the cage assembly of FIG. 2 such that it may encompass the entire body of a patient and to provide as many layers of radiation detectors as may be desired or as may be physically possible with the detectors mounted on the posts 3 such that each group of at least 8 detectors in each layer may be utilized to effect its own cross-sectional plane scan of the body area within the field of view of the detectors associated with that layer. The readout from each detector group layer may be effected selectively or simultaneously as may be desired.

The details of a single radiation detector assembly 2 is illustrated in FIG. 3. The detector includes a 1½ inch in diameter by one-half inch thick sodium iodide crystal 8 optically coupled to a 2 inch photomultiplier tube 10 which may be a Dumont, Model 6292, for example. The signal from the photomultiplier tube 10 is amplified by a preamplifier 11, Hamner Model NB–12, for example, mounted on its base. A lead focusing collimator 7 is mounted adjacent to and coupled to the face of the crystal 8. A lead shield 9 encompasses the photomultiplier tube 10, and a lead lined aluminum housing 12 encloses a portion of the detector assembly as shown.

Figure 4:
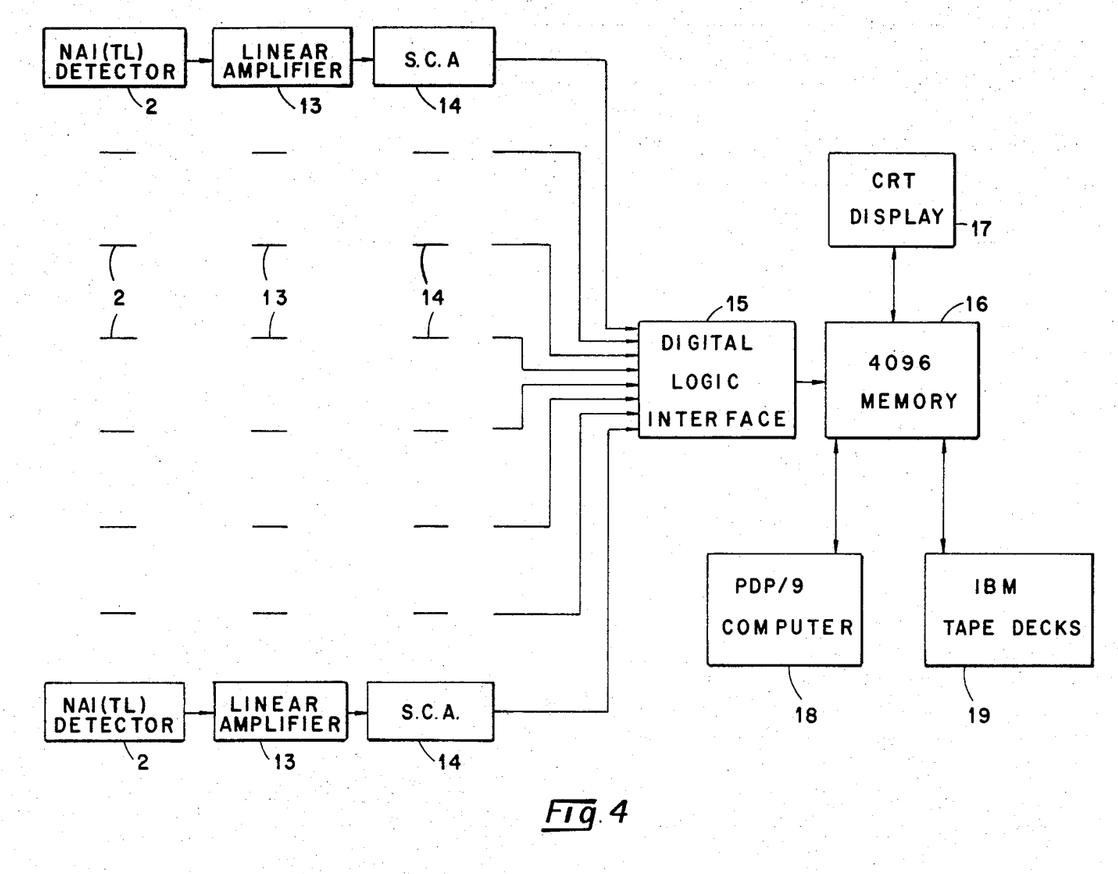
FIG. 4 is a block diagram of the data acquisition system used with the scanner of FIG. 1.

The data acquisition portion of the present invention is shown in block diagram in FIG. 4. The data from each detector 2 of the scanner of FIG. 2 are handled by its own linear amplifier 13, and single channel analyzer 14 and then placed, by the digital logic interface 15, into the cell of the 4096 channel analyzer 16 corresponding to the position of the tomographic scanner in its rectilinear raster. An array of 64 by 64 intensity modulated data points is visible in real time on the CRT display 17, corresponding to the area of activity being examined. In addition, the data can be stored on digital magnetic tape by the use of tape decks 19, and/or transferred to a computer 18 for computer analysis. The computer 18 is provided with means to correct for any speed variations of the scanner and to correct for nonuniformity of response to the field of view. Straight summing of the outputs of the single channel analyzers 14 is usually performed by means of the digital logic interface 15. However, when it is desired or required, the unit 15 is adapted to effect other various options. For example, coincidence counting and rejection from the individual detectors 2 may be effected by the unit 15. In addition, where there exist superficial areas of activity in an area which is being scanned, which areas are commonly known as artifacts, and such artifacts tend to allow misrepresentation of radioactivity distributions in the output scan picture, the unit 15 may then include a logic circuit, commonly known as a ring counter. Such a ring counter is an example of an associated device which aids in the prevention of effects caused by artifacts.

The various components of the system shown in the block diagram of FIG. 4 may be identified by the following commercially available units, for example. The subcomponents of the detector units 2 have already been identified hereinabove. The linear amplifiers 13 may be Hamner Model NA11, the single channel analyzers 14 may be Hamner Model NC–11, the CRT display unit 17 may be the Intertechnique Company, Dover, N.J., Model RG–96, the 4096 memory unit may be Intertechnique Model BM–96, the computer 18 may be a Digital Equipment Corporation Model PDP/9, and the tape decks unit 19 may be IBM Model 727. It should be noted that the unit 19 includes a tape controller IBM Model 754 for controlling the tape decks. The digital logic interface 15 is described in a thesis entitled "A Digital Data Acquisition System For Use In Nuclear Medicine Scanning And Whole Body Counting" by William Elbert Cook, Jr., a PhD Dissertation, Vanderbilt University, Nashville, Tennessee 1969. This Dissertation has been assigned an Atomic Energy Commission report No. ORO– 2401–23 and a copy thereof may be obtained, upon request, from the Division of Technical Information Service, P. O. Box E, Oak Ridge, Tennessee. In addition, a Dissertation Abstract of the above thesis may be obtained, by request, by writing to: University Microfilms, 300 N. Zeeb Road, Ann Arbor, Michigan, 48106.

Figure 5:
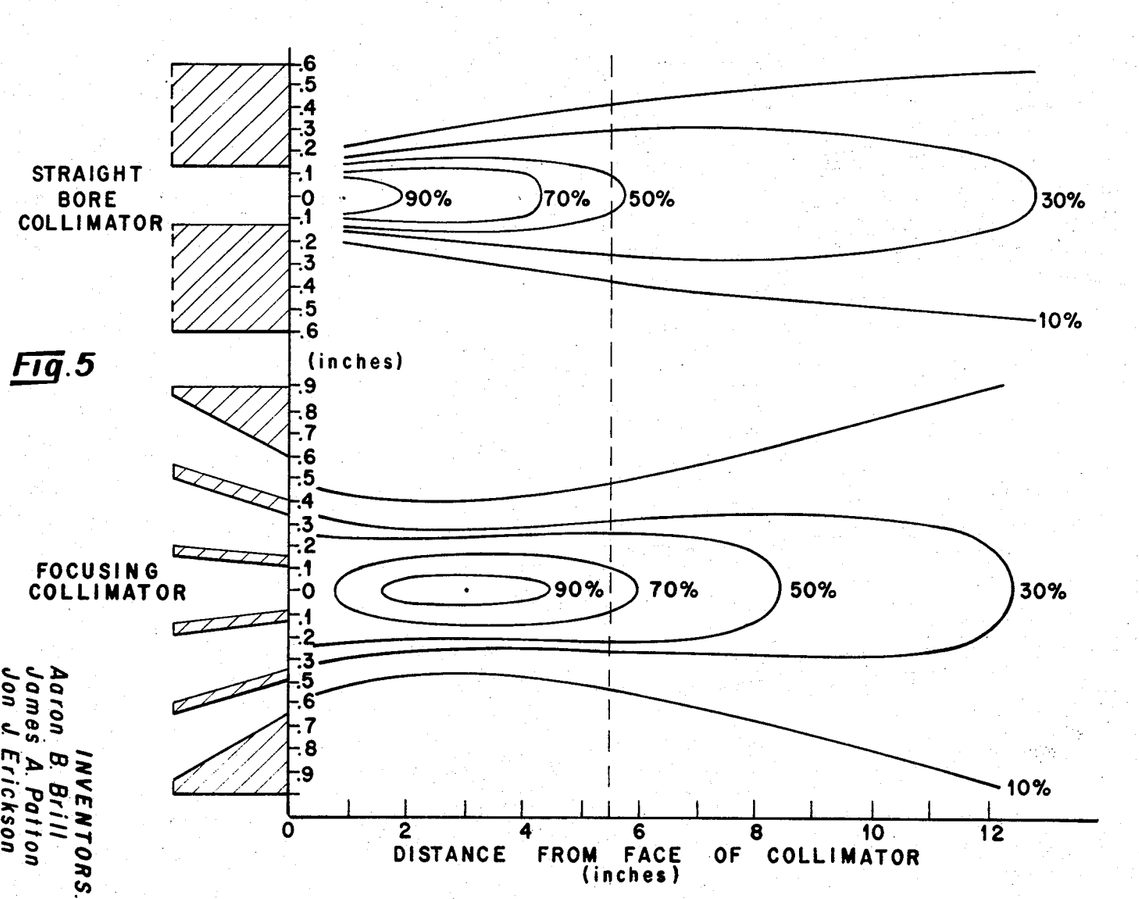
FIG. 5 is a schematic diagram illustrating a comparison of isoresponse curves for a detector utilizing different types of collimators.
Figure 6:
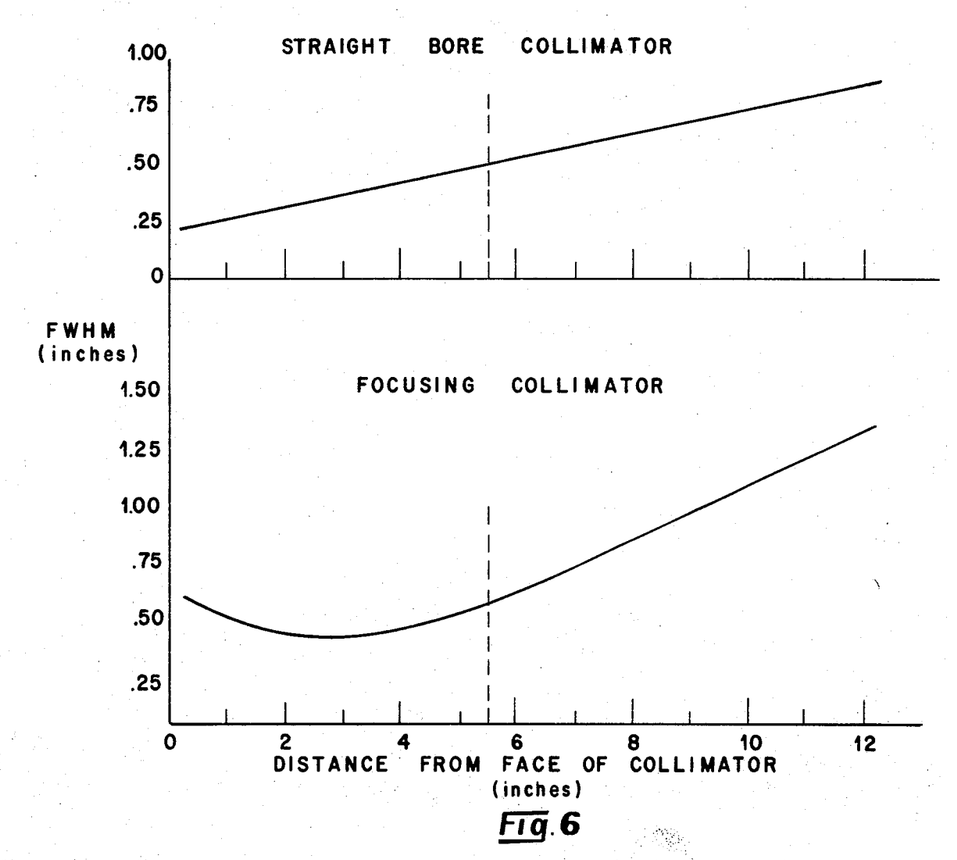
FIG. 6 is a pair of graphs illustrating a comparison of the resolution obtained by different types of collimators in a detector.

The radiation detectors used in the scanner of FIG. 2 utilize multihole focusing collimators designed by Robert Beck of the Argonne National Laboratory. Single hole straight bore collimators were first used in the detectors but their use was abandoned for the reason that their use resulted in poor pictorial quality due to low sensitivity. On the other hand, the multihole focusing collimator has a uniform response over a wide depth. To demonstrate the difference in response of the two types of collimators, reference is made to FIG. 5 which shows a comparison of the isoresponse curves for the two types of collimators for a line source of $^{99}Tc^m$. This isotope emits 140 Kev. X-rays and is widely used in diagnostic scanning. The faces of the collimators in each instance were 5½ inches from the center of the scanning area which is represented in the figure by a broken line. It can be noted that the center of the scanning area is just reached by the 50 percent envelope for the straight bore collimator, whereas the 50 percent envelope for the focusing collimator extends out to a distance of 8½ inches. This distance covers most of the scanning area. FIG. 6 shows a comparison of the plots of the full width at half maximum of the line response curves versus distance from the faces of the collimators. It should be noted that the response of the focusing collimator is reasonably uniform out to the center of the scanning area. The use of the multihole focusing collimators has increased the sensitivity of the system to a line source at the center of the scanning area by a factor of 16 with no loss in resolution.

Figure 9:
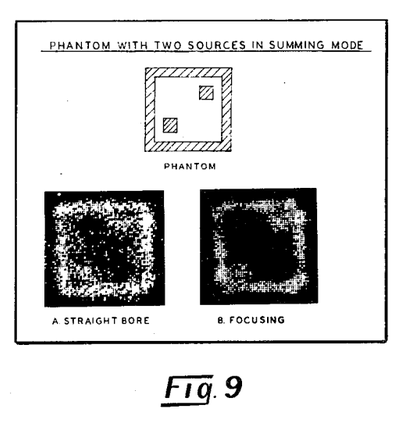
FIG. 9 shows scans made of a phantom which approximates the size of a head.

FIG. 9 shows scans made with the above described system of a phantom which approximates the size of a head. It consists of a one-half inch outer annulus and two 1 inch by 1 inch inner boxes. Each of the boxes can be filled individually. These scans were made with the same specific activity of $^{99}Tc^m$ in the annulus and in the two sources inside the annulus. Scan A was made with the straight bore collimators and scan B with the focusing collimators. The phantom in scan B had one-fourth the activity that it had in scan A. Both scans were made in the straight summing mode at the same scanning speed with a time of 5 minutes required. It can be noted that the pictorial quality has been greatly improved with the use of the multihole focusing collimators.

It should be noted that any further discussion hereinbelow of the above described system will relate to the use of the multihole focusing collimators in the radiation detectors and in the other embodiments of the present invention to be described hereinbelow.

In the operation of the above described system and before each scanning period, the detectors are focused on a point source in the center of the scanning area and balanced. After this calibration procedure has been effected, the system is now ready to perform any desired cross section scan in a straightforward, accurate and efficient manner in a minumum of time.

Figure 10:
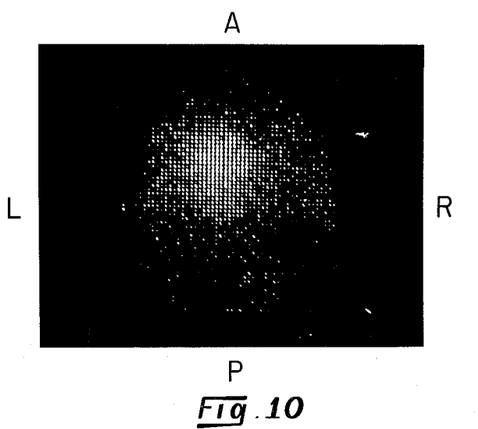
FIG. 10 shows a transverse-section brain scan of a 7 year-old child.

FIG. 10 shows a transverse-section scan of a 7 year-old child with a history of headaches and nausea which scan was obtained in a routine operation of the above described system. This scan clearly shows a large area of increased activity in the left anterior region. Subsequent surgery revealed a large malignant tumor in this patient.

There are several potential advantages of the above-described tomographic scanning system. The use of many detectors increases the sensitivity of the system and thus will permit the use of fine resolution collimators. Data handling for display generation is all handled with simple digital logic, and therefore additional detectors in the same or adjacent planes can be added easily and cheaply, if desired. The online CRT display permits observation of the data as they are being taken. Computer analysis of a scan may not be necessary, but if needed can be performed during of after the scan is completed. The use of the online CRT display in the present invention also permits the use of short-lived radioisotopes in the patients being studied thus minimizing any radiation hazard to these patients. Examples of other short-lived radioisotopes that may be utilized in the practice of this invention include $^{113}In^m$ and $^{68}Ga$, in addition to $^{99}Tc^m$ mentioned hereinabove. The choice of the particular radioisotope to be utilized depends upon the body area to be scanned and it should be understood that other than the above mentioned radioisotopes may be employed when and if desired.

One of the applications of the above described tomographic scanner is its adaptation for scanning of brain tumors using stable tracers. It has been shown that brain tumors take up bismuth to a concentration of as much as 75 to 100 times that for normal brain tissue after introduction of bismuth into the body. However, there are no good radioactive isotopes of bismuth which are suitable for diagnostic scanning in humans. $^{206}Bi$ has been used only to a very limited extent, but it is not practical due to the high dose rates inherent in its use. However, stable bismuth and other stable tracers may be utilized in practicing the present invention by mapping distributions of the stable tracer by counting the fluorescent radiations emitted therefrom when an external exciting source is used in association with the tracer. The scanner of FIG. 2 can be modified to perform fluorescence scanning when stable tracers are being utilized. Such a modification is illustrated in FIG. 7 to which reference is now made.

Figure 7:
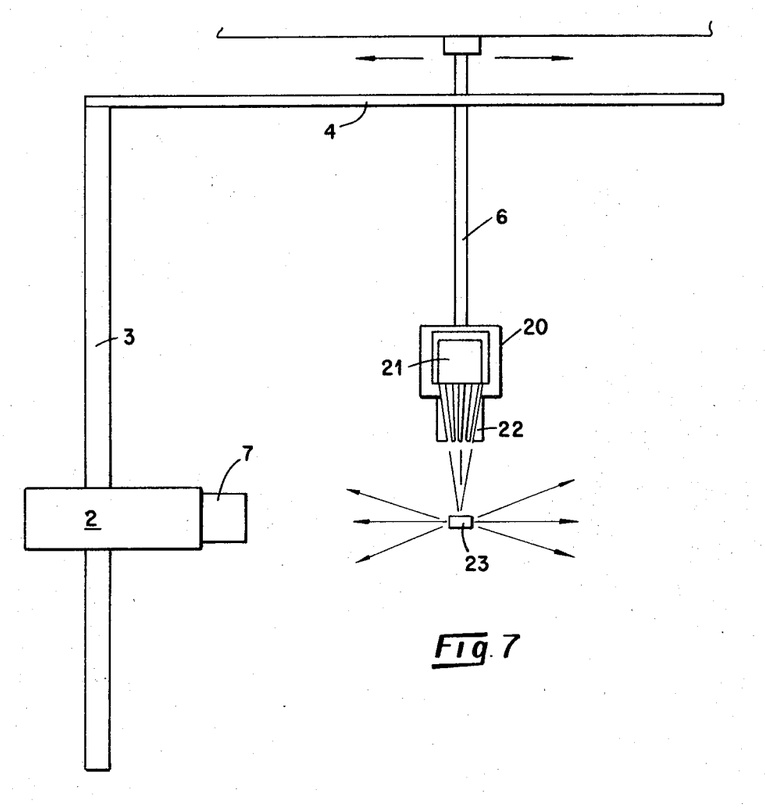
FIG. 7 is a schematic showing of another scanner embodiment of the present invention.

The scanner illustrated in FIG. 7 is identical to the scanner of FIG. 2 except for the following changes. The lead focusing collimators of the radiation detectors of FIG. 2 are replaced by cadmium focusing collimators in the scanner of FIG. 7. Such cadmium collimators are used in FIG. 7 when bismuth is used as the stable tracer for the reason that there is a problem of separating the bismuth fluorescence radiation from the lead fluorescence radiation produced in lead collimators when the lead collimators are used. This problem is substantially solved by using the cadmium collimators.

In addition to the above change, an exciting source 21 is suspended from the driving shaft 6 of the scanner and positioned so that its focal point is always at the common scanning point of the eight radiation detectors 2, only one such detector being shown in FIG. 7. The source 21 is enclosed within a lead container 20 which is provided with an opening into which is fitted a cadmium focusing collimator 22. The source 21 may be $^{99}Tc^m$, for example.

In the operation of the device of FIG. 7, the only area being irradiated is a cylinder through the point of intersection of the fields of view of the radiation detectors 2, and as this point of intersection is caused to be moved in a rectilinear raster by the driving shaft 6, the exciting source 21 and its output cylinder of irradiation will also follow this same raster since the source 21 is affixed to the lower end of the shaft 6.

Measurements made with one collimated sodium iodide radiation detector have determined that the number of X-rays detected from a known quantity of bismuth in solution, such as may be represented by the phantom 23 in FIG. 7, is a linear function of the activity of the exciting source. The number of X-rays detected is also a linear function of the quantity of bismuth present. The scanner of FIG. 7 may be used with the same data acquisition system as was used for the scanner of FIG. 2, the details of which are shown in FIG. 4 and described hereinabove. Thus, the scanning system of FIGS. 1—4, as modified by the changes described for FIG. 7, can be effectively utilized for mapping distributions of stable tracers injected or infused into an area of the human body by counting the fluorescent radiations emitted from such tracers when an external exciting source is used in association therewith as illustrated in FIG. 7.

Figure 8:
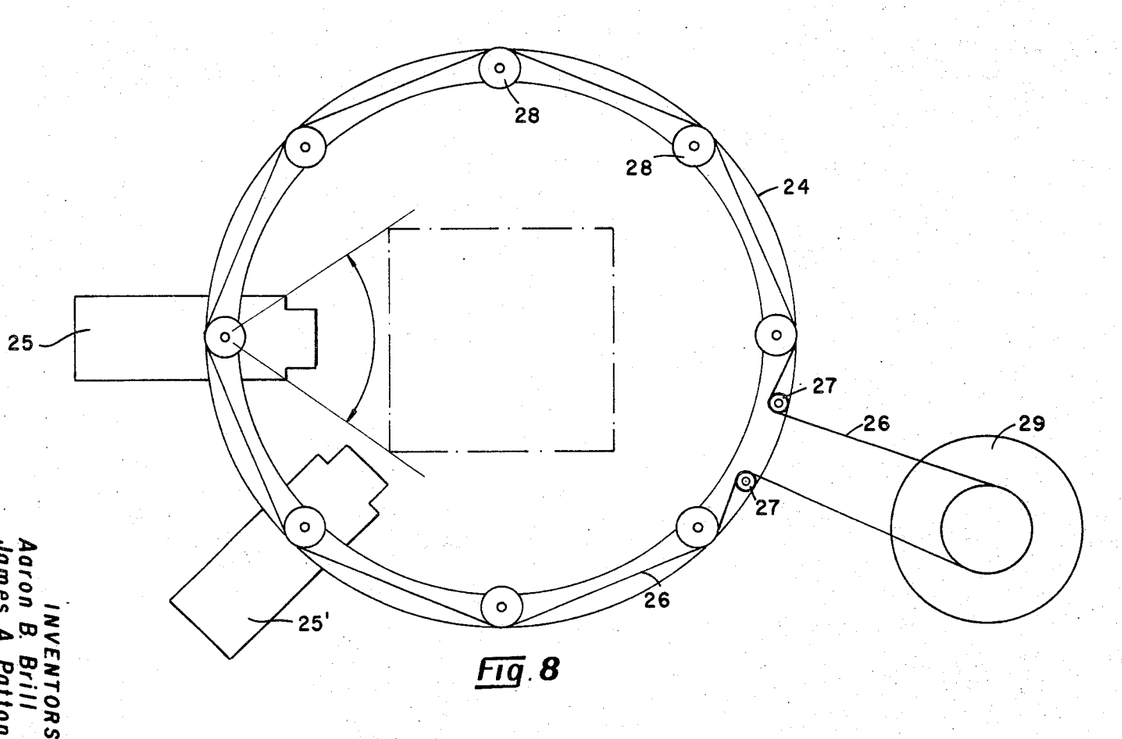
FIG. 8 is a schematic showing of a top view of another scanning embodiment of the present invention.

Another scanner embodiment of the present invention is illustrated in FIG. 8, and it utilizes a scanner cage assembly substantially identical to the one shown in FIG. 2, described hereinabove, but utilizes a different drive system for positioning the radiation detectors. The top view of the scanner arrangement of FIG. 8 shows only two radiation detector units 25 and 25'. It should be understood that the device of FIG. 8 includes 6 other detectors, not shown.

A top ring 24 is spaced about two feet from a bottom ring, not shown, and there are 4 support posts as well as 8 other posts for supporting the detector units, and all of these posts are mounted to the top and bottom rings in a manner similar to that shown in FIG. 2, to define a cylindrical cage assembly. The detector support posts are free to rotate by means of bearing assemblies in the top and bottom rings and these posts extend above the top ring 24 and are affixed to gears 28. A precision stepping motor 29 is provided and a drive belt 26 is coupled to the drive shaft of the motor 29 and this belt is fitted around each of the gears 28, and around a pair of pulleys 27 mounted in the top ring 24, such that by operating the stepping motor, each radiation detector will be swept through a square scanning area defined by the dashed line shown in the middle of the device of FIG. 8. Each of the eight detectors is swept through the same cross-sectional scanning area only once at a constant angular velocity by the motor 29. The total angular movement of each detector may be about 68°, for example, such that the composite total area covered by the eight radiation detectors in a scanning operation is about an 8-inch square area enclosed by the dashed line as shown in FIG. 8.

In the operation of the device of FIG. 8, data will be collected at preset angular increments and stored in the 4096 channel analyzer with the origin of each data point also being recorded. At the completion of the data collection, the data are processed by the PDP-9 computer. The computer makes use of the response characteristics of the detectors to reconstruct the distribution of activity in the scanning area for display purposes.

The advantage of this mode of operation of FIG. 8 is that data can be collected at much faster rates than with the system of FIG. 2. Thus, the system of FIG. 8 will be useful for dynamic function studies and for studies using very short-lived, high activity isotopes.

Although the system of FIG. 8 provides for collecting data at much faster rates, it does not lend itself to an online display since the data from each of the respective radiation detector units is collected individually in the 4096 memory unit and subsequent processing by the PDP-9 computer is required to provide a reconstructed scan picture.

This invention has been described by way of illustration rather than limitation and it should be apparent that it is equally applicable in fields other than those described.

What we claim is:

1. An improved tomographic scanner for measuring and mapping cross sections of radioactivity in a selected section of the human body which has been injected with a selected radioisotope, comprising a plurality of radiation detectors, means for supporting said detectors in a cylindrical monoplanar array, means for mechanically coupling said detectors together such that the fields of view of all of the detectors intersect at a common point at all times, means coupled to and associated with said mechanical coupling means for effecting continuous movement of each of said detectors to effect a movement of said common point in a rectilinear raster, means coupled to the outputs of said detectors for summing the data received therefrom, means storing said summed data for each point in said raster, and an oscilloscope display device coupled to said storing means for providing an online display of the radioactivity distribution of said body section as it is being scanned by said scanner.

2. The scanner set forth in claim 1, wherein each of said detectors includes a multihole focusing collimator, a sodium iodide crystal coupled to said collimator, a photomultiplier tube coupled to said crystal, and a preamplifier mounted on the base of said tube.

3. The scanner set forth in claim 1, wherein said support means for said detectors includes a cylindrical cagelike assembly consisting of a top ring and a bottom ring and a plurality of vertical support posts separating said rings and affixed thereto, a plurality of rotatable additional vertical posts extending between said rings and through journal bearings in said rings, respective ones of said detectors being mounted on respective ones of said rotatable posts to from said monoplanar array of detectors.

4. The scanner set forth in claim 3, wherein said means for mechanically coupling said detectors together comprises a plurality of horizontal slotted arms, one each of said arms affixed to the top of one each of said rotatable detector supporting posts, and a common shaft extending through each of said slotted arms to provide a common driving point for said arms and said rotatable posts attached thereto, said common driving point being directly above said common intersection point for the fields of view of said detectors, said common driving point shaft being adapted to move both of said common points simultaneously through said rectilinear raster.

5. The scanner set forth in claim 4, wherein the number of radiation detectors in said monoplanar array is at least eight.

6. The scanner set forth in claim 5, wherein said summing means comprises a digital logic interface and said data storing means comprises a 4096 channel analyzer for storing an array of 64 by 64 data points therein.

7. The scanner set forth in claim 5, wherein said scanner is adapted to scan a body section which has been injected with a stable tracer, said scanner being further provided with an exciting source suspended from the lower end of said rectilinear driving shaft, said exciting source directing exciting rays through said common intersection point of said detectors for effecting fluorescence radiation in said stable tracer within said body section, whereby said scanner provides for fluorescence scanning of the excited tracer.

8. The scanner set forth in claim 6, and further including a computer and tape decks coupled to said 4096 channel analyzer.

9. The scanner set forth in claim 6, wherein said rotatable detector supporting posts are provided with a plurality of additional monoplanar arrays of radiation detectors, whereby a plurality of cross-sectional scans may be effected simultaneously during the rectilinear scanning of said scanner.

10. The scanner set forth in claim 1, wherein said mechanical coupling of said detectors is replaced with a precision stepping motor, said detectors being coupled to said motor in such a manner that each of said detectors is swept through a preselected angle only once during a scanning operation, and said summing means, storing means and oscilloscope display are replaced with a 4096 channel analyzer connected to the outputs of said detectors and a computer coupled to said analyzer.